United States Patent
Reusmann et al.

(10) Patent No.: US 6,794,445 B2
(45) Date of Patent: Sep. 21, 2004

(54) AQUEOUS POLYSILOXANE-POLYURETHANE DISPERSION, ITS PREPARATION AND USE IN COATING COMPOSITIONS

(75) Inventors: Gerhard Reusmann, Essen (DE); Markus Hallack, Bottrop (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 10/413,703

(22) Filed: Apr. 15, 2003

(65) Prior Publication Data

US 2003/0198819 A1 Oct. 23, 2003

(30) Foreign Application Priority Data

Apr. 17, 2002 (DE) .......................................... 102 16 896

(51) Int. Cl.⁷ ................................................. C08G 3/20
(52) U.S. Cl. ........................ 524/588; 524/837; 524/838; 528/26; 528/29
(58) Field of Search ................................. 524/837, 838, 524/588; 528/26, 29, 28

(56) References Cited

U.S. PATENT DOCUMENTS

| | | | |
|---|---|---|---|
| 3,124,605 A | 3/1964 | Wagner | |
| 3,479,310 A | 11/1969 | Dieterich et al. | |
| 3,903,126 A | 9/1975 | Woerner et al. | |
| 3,903,127 A | 9/1975 | Wagner et al. | |
| 3,976,622 A | 8/1976 | Wagner et al. | |
| 4,324,879 A | 4/1982 | Bock et al. | |
| 4,663,377 A | 5/1987 | Hombach et al. | |
| 5,798,409 A | * 8/1998 | Ho .............................. 524/506 |
| 6,277,386 B1 | * 8/2001 | Kim et al. ................... 424/401 |
| 6,365,697 B1 | * 4/2002 | Kim et al. ..................... 528/28 |
| 6,395,265 B1 | * 5/2002 | Mougin et al. ........... 424/70.12 |

FOREIGN PATENT DOCUMENTS

| | | |
|---|---|---|
| DE | 26 51 506 A1 | 5/1978 |
| DE | 41 36 618 A1 | 5/1993 |
| EP | 0 578 940 A1 | 1/1994 |
| EP | 0 669 352 A1 | 8/1995 |
| EP | 0 669 352 B1 | 12/1998 |
| JP | 63-132919 | 6/1988 |
| WO | wo 92/01626 | 2/1992 |

OTHER PUBLICATIONS

D. H. Solomon, "The Chemistry of Organic Film Formers", pp. 222–250, John Wiley & Sons, Inc., New York, 1967.

Eugen Muller, "Methoden der organsichen Chemie" (Houben–Weyl), vol. 14, part 2, 4$^{th}$ Edition, pp. 319–320, Georg Thieme Verlagm, Stuttgart, 1963.

* cited by examiner

Primary Examiner—Margaret G. Moore
(74) Attorney, Agent, or Firm—Frommer Lawrence & Haug LLP

(57) ABSTRACT

The invention relates to aqueous dispersions of polysiloxane-polyurethanes based on selected, substantially difunctional starting materials, to their preparation and use for preparing coating compositions, and to a coating composition comprising as substantial binder component polysiloxane-polyurethanes of the kind mentioned. The coating compositions of the invention are especially suitable for use as soft feel coatings.

3 Claims, No Drawings

AQUEOUS POLYSILOXANE-POLYURETHANE DISPERSION, ITS PREPARATION AND USE IN COATING COMPOSITIONS

RELATED APPLICATIONS

This application claims priority to German Patent Application 102 16 896.2, filed Apr. 17, 2002, herein incorporated by reference.

BACKGROUND OF THE INVENTION

The invention relates to aqueous dispersions of polysiloxane-polyurethanes based on selected, substantially difunctional starting materials, to their preparation and use for preparing coating compositions, and to a coating composition comprising as substantial binder component polysiloxane-polyurethanes of the kind mentioned. The coating compositions of the invention are especially suitable for use as soft feel coatings.

DESCRIPTION of the RELATED ART

Modern aqueous binders are capable in many applications of substituting organically dissolved binders. This is so in particular in those segments where aqueous binders may have specific advantages, such as in electrocoating, for example.

For applications having highly specific requirements, such as the painting or coating of plastics with soft feel effect coating materials, there has to date been a lack of satisfactory aqueous binders which meet the requirements imposed.

The level of properties presented by the organically dissolved soft feel coating materials based on polyurethane (for example, WO-92/1626 or JP-A-279 620 with the publication number J63 132-919-A), particularly in terms of the soft feel effect, the solvent resistance, the mechanical properties of the film and its adhesion to the substrate, is not attained by aqueous systems. In particular, the combination of a good soft feel effect with a satisfactory solvent resistance on the part of the coating is not possible with state of the art aqueous products.

EP-A-578 940 discloses in this respect water-dispersible polyurethanepolyols based on branched polyesterpolyols.

The use of aqueous polyester-polyurethane dispersions is described in EP-A-669 352. Here again, the soft feel effect is achieved only by the addition of special flatting agents to the Polyester-Polyurethane dispersion.

OBJECTS OF THE INVENTION

It is therefore an object of the invention to provide aqueous binders suitable for high-elasticity coating materials, coatings and sealants, especially for soft feel coating materials, which combine a good soft feel effect with good film mechanical properties and adhesion and also a satisfactory solvent resistance and which, furthermore, contain volatile organic substances to the smallest possible extent, so as to be able to meet exacting requirements with respect to environmental compatibility as well.

It has been possible to achieve these objects and others with the provision of the aqueous polysiloxane-polyurethane dispersions described in more detail below and of the coating compositions based on said dispersions.

DESCRIPTION OF THE INVENTION

In a first embodiment the invention provides aqueous dispersions of polysiloxane-polyurethanes having an acid number of from about 5 to about 100 mg KOH/g polysiloxane-polyurethane solids, a hydroxyl group content of from about 0.25 to about 6.5% by weight, and a urethane group content (calculated as —NH—CO—O—) of from about 2.0 to about 25.0% by weight, based in each case on polysiloxane-polyurethane solids, wherein the polyurethanes are products, where appropriate at least partly neutralized with bases, of the reaction of a) a total of from about 3 to about 25% by weight of at least one linear polydimethylsiloxanediol of the molecular mass range about 1,500 to about 10,000, b) A total of from about 15 to about 90% by weight of at least one further difunctional polyol, selected from the group consisting of
  i) hydroxyl-containing polycarbonates of the molecular mass range about 400 to about 6,000,
  ii) hydroxyl-containing polyetherpolyols of the molecular mass range about 350 to about 3,500,
  iii) ester-functional polyesterpolyols obtained from dimer fatty acids by hydrogenating the carboxyl groups to hydroxyl groups, alkoxylating the carboxyl groups or esterifying the carboxyl groups with low molecular mass diols, and
  iv) hydroxyl-containing linear polyesterpolyols of the molecular mass range about 500 to about 4,000, c) a total of from about 1 to about 10% by weight of at least one acid component composed of
  i) hydroxycarboxylic acids,
  ii) aminocarboxylic acids,
  iii) aminosulfonic acids or
  iv) alkali metal salts of such acids, d) a total of from 0 to about 20% by weight of at least one low molecular mass component composed of at least one compound containing at least two hydroxyl and/or amino groups, of the molecular mass range about 60 to about 300, e) a total of from 0 to about 20% by weight of at least one hydrophilic monohydric or dihydric alcohol containing ethylene oxide units, of the molecular mass range about 350 to about 3,000, f) a total of from about 5 to about about 50% by weight of at least one polyisocyanate component composed of at least one organic polyisocyanate of the molecular mass range about about 168 to about about 1,000, at least about about 50% by weight of the polyisocyanate component comprising linear aliphatic diisocyanates of the molecular mass range about 166 to about 300, the stated percentages adding up to 100% by weight of the polyurethane fractions of the polysiloxane-polyurethane solids.

The incorporation of relatively high molecular mass polydimethylsiloxanediols with molecular masses above about 1,500 g/mol is not possible in accordance with the state of the art, since the severe incompatibility with the organic reaction components only allows an inadequate conversion. Since low molecular mass polydimethyl-siloxanes below a molecular mass of about 1,500 g/mol do not exhibit soft feel effects, a further object of this invention is to develop a suitable synthesis for polysiloxane-polyurethane dispersions.

This invention accordingly further provides a process for the stepwise preparation of these dispersions, which comprises in a first step preparing an isocyanate-functional prepolymer (I) from components a), b), c), and f) and also d) and e) where present in each case, the NCO/OH ratio being from about 1.8:1 to about 3.0:1. The resulting prepolymer (I) is then reacted to an isocyanate-functional prepolymer (II) by reaction with component b) and/or d) where present, the NCO/OH ratio being from about 1.2:1 to about 1.6:1. Then, by reaction with further polyol as component b) and/or d), this product is converted to the final hydroxyl-containing polysiloxane-polyurethane polymer, in which NCO groups are no longer detectable, and this polymer is dispersed by addition to water in the presence of a neutralizing agent.

The invention also provides for the use of these dispersions for preparing aqueous coating compositions based on water-dispersed binders and crosslinker resins selected from the group consisting of amino resins, optionally hydrophilically modified blocked polyiso-cyanates, and optionally hydrophilically modified polyisocyanates having free isocyanate groups.

The invention additionally provides aqueous coating compositions, comprising where appropriate the customary auxiliaries and additives, comprising as binder a combination of A) a polyol component with B) a crosslinker resin selected from the group consisting of melamine resins, optionally hydrophilically modified blocked polyisocyanates, and optionally hydrophilically modified polyisocyanates having free isocyanate groups, wherein from about 25 to 100% by weight of the polyol component A) is composed of a hydroxyl-containing polysiloxane-polyurethane of the type present in dispersed form in accordance with the invention and from 0 to about 75% by weight of the polyol component A) is composed of binders other than these polysiloxane-polyurethanes.

The polysiloxane-polyurethane dispersions of the invention generally have solids contents of from about 15 to about 68% by weight, preferably from about 33 to about 60% by weight, and viscosities, determined using a rotational viscometer at 23° C., of from about 10 to about 20,000 mPas, preferably from about 50 to about 5,000 mPas. The pH is situated generally between about 5 and about 10, preferably at from about 6 to about 8, and is determined in accordance with DIN 53 785 following dilution with distilled water to a solids content of 10% by weight. The term "dispersion" moreover, is intended in the context of the present invention to embrace both true aqueous dispersions and also aqueous solutions. The question of whether a particular system is a dispersion or solution is dependent in particular on the amount of saltlike groups present and on the molecular mass of the polymers.

The polysiloxane-polyurethanes present as the disperse phase in the dispersions have in particular, based on solids, a urethane group (—NH—CO—O) content of from about 2.0 to about 25.0% by weight, preferably from about 4.0 to about 19.0% by weight, an acid number of from about 5 to about 100 mg KOH/g, preferably from about 8 to about 40 mg KOH/g, the acid number relating both to free acid groups and to base-neutralized acid groups of the solid, and a hydroxyl group content of from about 0.3 to about 6.5% by weight, preferably from about 0.5 to about 3.5% by weight. The water dilutability of the polysiloxane-polyurethanes can be attributed essentially to the presence therein of the aforementioned anionic groups.

The starting component a) essentially comprises linear, especially α,ω-dihydroxyalkyl, polydimethylsiloxanes of molecular mass about 1,500 to about 10,000, preferably about 2,000 to about 4,000, with particular preference about 2,000 to about 3,000 g/mol.

The term "linear" is intended to denote that the compounds contain on average per molecule not more than about 0.5, preferably less than about 0.3, and with particular preference less than about 0.1 branching site, i.e., that the (average) hydroxyl functionality is not more than about 2.5, preferably not more than about 2.3, and with particular preference not more than about 2.1. The term "substantially difunctional" is intended to denote that the compounds contain on average per molecule not more than about 0.1 and preferably no branching sites, i.e., that the average. hydroxyl functionality is not more than about 2.1, and is preferably about 2.0.

The figures given for the molecular mass of the starting components, here and also above and below, are always the average molecular mass which can be calculated from hydroxyl group content and hydroxyl functionality.

The polydimethylsiloxanepolyols are preferably linear polydimethylsiloxanes having terminal hydroxyalkyl functions and an average molecular mass of from 1,500 to 3,000, such as Tegomer® H-Si 2111 and Tegomer® H-Si 2311 (Goldschmidt AG). Likewise suitable are hydroxy(polycaprolactone)-modified polydimethylsiloxanes, such as Tegomer® H-Si 6440 (Goldschmidt AG).

Particular preference is given to the linear hydroxyalkyl-functional polydimethylsiloxane Tegomer® H-Si 2311.

Corresponding amino-containing polydimethylsiloxanes such as, for example, Tegomer ® A-Si 2322 (Goldschmidt AG) can likewise be reacted in accordance with the synthesis of the invention, but produce less weathering-stable coatings.

The corresponding silanol-functional (Si-OH) polydimethylsiloxanes are less preferred on account of the lower reactivity toward isocyanates.

It is likewise possible, of course, but not preferable, to use linear functional polydiphenyl-, polymethylphenyl- or polyalkylsiloxanes as well, or else copolymers thereof.

The starting component b) comprises difunctional polyols selected from the group consisting of i) hydroxyl-containing polycarbonates of the molecular mass range about 400 to about 6,000, ii) hydroxyl-containing polyetherpolyols of the molecular mass range about 350 to about 3,500 containing preferably less than about 30% by weight of ethylene oxide units, based on all the alkylene oxide units present in the form of polyether chains, iii) ester-functional polyesterpolyols obtained from dimer fatty acids by hydrogenating the carboxyl groups to hydroxyl groups, alkoxylating the carboxyl groups or esterifying the carboxyl groups with low molecular mass diols, and iv) hydroxyl-containing linear polyesterpolyols of the molecular mass range about 500 to about 4,000.

The preparation of the polyesterpolyols is described in EP-A-669 352.

Suitable polycarbonatepolyols are obtained, for example, by reacting carbonic acid derivatives, such as diphenyl carbonate or phosgene, with alcohols, preferably diols. Suitable diols are described, for example, in connection with starting component a2).

Particularly suitable polyetherpolyols are the ethoxylation and/or propoxylation products of water or of diols of the type already exemplified as starting component a2), with the proviso that the ethylene oxide content, based on all the alkylene oxide groups incorporated, is below about 30% by weight.

Especially preferred polyols b) are difunctional polyesterdiols of molecular mass about 750 to about 4,000 and also difunctional polycarbonatepolyols of molecular mass about 750 to about 4,000.

Starting component c) comprises at least one hydroxycarboxylic acid and/or aminocarboxylic acid and/or aminosulfonic acid and/or hydroxysulfonic acid of the type specified, for example, in U.S. Pat. No. 3,479,310. Preferred components c) include 2,2-bis(hydroxymethyl)- alkanemonocarboxylic acids having a total of from 5 to 8 carbon atoms, i.e., compounds of the general formula

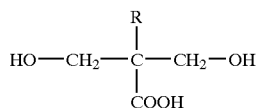

in which

R stands for an alkyl radical having 1 to 4 carbon atoms.

Very particular preference as component c) is given to 2,2-dimethylolpropionic acid and 2,2-dimethylolbutyric acid.

As already indicated above, it is also possible, instead of the free acid, to use the corresponding alkali metal salts, provided the salts are sufficiently compatible with the other synthesis components.

Starting component d) comprises compounds containing at least two hydroxyl and/or amino groups, of molecular mass about 60 to about 300. Suitable examples include ethylene glycol, propylene glycol, neopentyl glycol, butanediol, hexanediol, cyclohexanedimethanol, diethylene glycol, dipropylene glycol, trimethylolpropane, 1,4-cyclohexanediol, glycerol, pentaerythritol, aminoethanol, aminoisopropanol, N,N'-dimethyl-1,3-diaminopropane, and mixtures of these and other corresponding compounds. Likewise suitable are low molecular mass reaction products of said compounds with ethylene oxide and/or propylene oxide and/or ε-caprolactone.

Preferred components d) are low molecular mass diols and triols of molecular mass about 90 to about 150, such as 1,4-butanediol, 1,6-hexanediol, neopentyl glycol, diethylene glycol, glycerol and/or trimethylolpropane.

A preferred polyol d) for preparing the prepolymer (1) is a dihydroxy-functional polyol such as 1,4-butanediol; a preferred polyol d) for the further reaction to give the prepolymer (II) is a trifunctional polyol such as trimethylolpropane.

The starting component e) preferably comprises nonionically hydrophilic polyethylene glycols having one or two hydroxyl groups. These are preferably monohydric or dihydric polyether alcohols of the molecular mass range about 350 to about 3,000, as obtained in conventional manner by alkoxylating monohydric or dihydric alcohol starter molecules, using as alkylene oxides ethylene oxide or mixtures of ethylene oxide with up to about 40% by weight, based on the total weight of the alkylene oxides, of propylene oxide.

One example of starting component e) is Tegomer® D3403 (Goldschmidt AG). Starting component f) preferably comprises linear aliphatic diisocyanates of the molecular mass range about 168 to about 1,000, in particular about 168 to about 300, such as hexamethylene diisocyanate, undecane 1,11-diisocyanate or dodecane 1,12-diisocyanate. Likewise suitable as starting component f), though less preferred, are mixtures of such linear aliphatic diisocyanates with other diisocyanates such as isophorone diisocyanate or 2,4-diisocyanatotoluene or else with "paint polyisocyanates" based on hexamethylene diisocyanate, of the type known per se having a maximum molecular mass of about 1,000. However, at least about 50% by weight of starting component f) is composed of linear aliphatic diisocyanates of the type mentioned at the outset.

Examples of suitable solvents for preparing the polysiloxane-polyurethane dispersions include N-methylpyrrolidone, methoxyhexanone, diethylene glycol dimethyl ether, methyl ethyl ketone, methyl isobutyl ketone, acetone, xylene, toluene, butyl acetate, methoxypropyl acetate, and mixtures of these or other solvents. The organic solvents used may be removed from the reaction mixture in whole or in part, where appropriate azeotropically and/or by applying a vacuum or an increased stream of inert gas, before, during or after the dispersing step.

Suitable catalysts for the urethanization reaction, i.e., the reaction of components a) to f), may be, for example, the following: triethylamine, tin(II) octoate, dibutyltin oxide, dibutyltin dilaurate, and other customary catalysts.

Examples of suitable bases for neutralizing the acid groups incorporated initially include ammonia, N-methylmorpholine, triethylamine, dimeihylethanolamine, methyldiethanolamine, morpholine, dimethylisopropanolamine, 2-amino-2-methyl-1-propanol, and mixtures of these and other neutralizing agents. Likewise suitable, though less preferred as neutralizing agents, are sodium hydroxide, lithium hydroxide, and potassium hydroxide.

Preferred neutralizing agents are ammonia, triethylamine, dimethylethanolamine, methyldiethanolamine, and dimethylisopropanolamine.

The dispersion is prepared, for example, by reacting from about 3.0 to about 25.0% by weight, preferably from about 5.0 to about 15.0% by weight, of starting component a) with from about 15.0 to about 90.0% by weight, preferably from about 20.0 to about 70.0% by weight, of starting component b), from about 1.0 to about 10.0% by weight, preferably from about 2.0 to about 7.0% by weight, of starting component c), from 0 to about 20.0% by weight, preferably from about 0.5 to about 10.0% by weight, of starting component d), and from 0 to about 20.0% by weight, preferably from 0 to about 10.0% by weight, of starting component e) with from about 5.0 to about 50.0% by weight, preferably from about 7.0 to about 30.0% by weight, of starting component e), the percentages given for a) to f) e) adding up to 100% by weight of the polyurethane fractions of the polysiloxane-polyurethane solids, in an organic solution with a concentration of from 40 to 100%, preferably from about 85 to 100% (100%=solvent-reparing free), comprising a first step of preparing an isocyanate-functional prepolymer (I) from components a), b), c), and f) and also d) and e) where present, in the presence of a catalyst, wherein the NCO/OH ratio is from about 1.8:1 to about 3.0:1, preferably from about 2.0:1 to about 2.5:1. The resulting prepolymer (I) is then converted by reaction with component d) where present to give an isocynate-functional prepolymer (II), wherein the NCO/OH ratio is from about 1.2:1 to about 1.6:1.

By reaction with further polyol, where appropriate, as component b) and/or d) the product is subsequently converted to the final hydroxyl-containing polysiloxane-polyurethane polymer, wherein NCO groups are practically no longer detectable.

This convention is generally operated observing an equivalents ratio of isocyanate-reactive groups to isocyanate groups of from about 1.2:1 to about 2.5:1, preferably from about 1.4:1 to about 2.0:1, so as to end up with reaction products having the aforementioned hydroxyl group content. Any carboxyl groups present in the reaction mixture that are intended for conversion into anionic groups are not to be regarded as "isocyanate-reactive" in this context.

Following said conversion, the reaction mixture is dispersed or dissolved in water, with from about 25 to 100%, preferably from about 45 to 100%, of any acid groups introduced into the reaction mixture having been converted during the reaction or before or during the dispersing step into salt groups by addition of a neutralizing agent. Incorporation of anionic groups in this way is of course unnecessary if salts, especially alkali metal salts, of appropriate amino- and/or hydroxy-carboxylic and/or sulfonic acids have already been employed as synthesis component c).

In order to carry out the dispersing step it is possible alternatively to add the water/neutralizing agent mixture to the resin, the resin to the water/neutralizing agent mixture, or the resin/neutralizing agent mixture to the water. By "resin" here is meant either the solventlessly prepared polysiloxane-polyurethane or its solution in one of the auxiliary solvents exemplified. The dispersing step is generally accomplished at a temperature within the range from about 20 to about 100° C., preferably from about 40 to about 100° C. The dispersibility of the polysiloxane-polyurethanes in water may be improved if desired by also using external emulsifiers during the dispersing operation. The polysiloxane-polyurethane dispersions of the invention generally have an organic solvent content of less than about 15% and preferably less than about 10% by weight. Following their preparation, it is possible to add further organic solvents to the dispersions of the invention for the purpose of obtaining certain properties, especially alcoholic solvents such as ethanol, n-butanol, n-octanol, butyldiglycol, ethyldiglycol, methyldiglycol or methoxypropanol, for example.

The dispersions of the invention constitute aqueous binder components for coating compositions based on water-dispersed polyhydroxyl compounds and crosslinker resins.

In this context the dispersions of the invention may be employed as sole binders or else in a blend with aqueous dispersions of other binders. Accordingly, based on solids, from about 25 to 100% by weight of the polyol component of the coating compositions of the invention is composed of polysiloxane-polyurethanes of the type according to the invention and from 0 to about 75% by weight is composed of other, water-dispersible or water-soluble binders. Other binders are, in particular, conventional, water-dispersible, optionally hydroxyl-containing polyester resins, polyacrylate resins or polyurethane resins, which differ in their chemical composition from the polysiloxane-polyurethanes of the invention. Preference is given in this context to polyurethane resins, as present, for example, in the PU dispersions described in DE-A-26 51 506. These polyurethane resins preferably contain no hydroxyl groups, are of linear construction, and have a molecular weight Mn (numerical average) (calculable from the stoichiometry of the starting materials used to prepare them) of at least 15,000. They are anionically and/or nonionically-hydrophilically modified. Preferred components A) are dispersions containing, based on solids, from about 80 to 100% by weight of polysiloxane-polyurethanes of the type according to the invention and from 0 to about 20% by weight of the preferred polyurethanes.

Suitable crosslinker resins B) are amino resins, optionally hydrophilically modified polyisocyanates having blocked isocyanate groups, and optionally hydrophilically modified polyisocyanates having free isocyanate groups.

Examples of suitable amino resins are water-dilutable or water-dispersible melamine-formaldehyde and urea-formaldehyde condensation products, as described, for example, in D. H. Solomon, The Chemistry of Organic Filmformers, p. 235 ff, John Wiley & Sons, Inc., New York, 1967. Alternatively, the melamine resins may be replaced in whole or in part by other crosslinking amino resins, as described, for example, in "Methoden der organischen Chemie" (Houben-Weyl), Vol. 14 Part 2, $4^{th}$ edition, Georg Thieme Verlag, Stuttgart 1963, p. 319 ff.

Further suitable crosslinker resins include blocked polyisocyanates, based for example on isophorone diisocyanate, hexamethylene diisocyanates, 1,4-diisocyanatocyclohexane, dicyclohexylmethane diisocyanate, 1,3-diisocyanatobenzene, 1,4-diisocyanatobenzene, 2,4-diisocyanato-1-methylbenzene, 1,3-diisocyanato-2-methylbenzene, 1,3-bisisocyanatomethylbenzene, 2,4-bisisocyanatomethyl-1,5-dimethylbenzene, bis(4-iso-cyanatophenyl)propane, tris-(4-isocyanatophenyt)methane, trimethyl-1,6-diisocyanatohexane or blocked "paint polyisocyanates" such as polyisocyanates containing biuret groups and based on 1,6-diisocyanatohexane, polyisocyanates containing isocyanurate groups and based on 1,6-diisocyanatohexane, or paint polyisocyanates containing urethane groups and based on 2,4- and/or 2,6-diisocyanatotoluene or isophorone diisocyanate on the one hand and low molecular mass polyhydroxyl compounds such as trimethylolpropane, the isomeric propanediols or butanediols or any desired mixtures of such polyhydroxyl compounds on the other, in each case having blocked isocyanate groups.

Likewise suitable are blocked polyisocyanates hydrophilicized, for example, by salt groups of polyether structures.

Examples of suitable blocking agents for these polyisocyanates are monohydric alcohols such as methanol, ethanol, butanol, hexanol or benzyl alcohol, oximes such as methyl ethyl ketoxime, lactams such as ε-caprolactam, phenols, or CH-acidic compounds such as diethyl malonate, for example.

Examples of suitable polyisocyanate crosslinkers B) containing free isocyanate groups include organic polyisocyanates having aliphatically, cycloaliphatically, araliphatically and/or aromatically attached free isocyanate groups, which are liquid at room temperature. Such polyisocyanate crosslinkers B) generally have a viscosity, determined using a rotational viscometer at 23° C., of from about 50 to about 10,000 mPas, preferably from about 50 to about 1,500 mPas.

Where necessary, the polyisocyanates may be employed as a blend with small amounts of inert solvents in order to lower the viscosity to a level within the specified ranges. Highly suitable, for example, are "paint polyisocyanates" based on hexamethylene diisocyanate or on 1-isocyanato-3,3,5-trimethyl-5-isocyanatomethylcyclohexane (IPDI) and/or dicyclohexylmethane diisocyanate. By "paint polyisocyanates" based on these diisocyanates are meant the derivatives of these diisocyanates that are known per se and contain biuret, urethane, allophanate, uretdione and/or isocyanurate groups and which following their preparation have been freed in a known way, preferably by distillation, from excess starting diisocyanate down to a residual content of less than about 0.5% by weight. The preferred aliphatic polyisocyanates for use in accordance with the invention include the polyisocyanates which meet the above criteria, contain biuret groups, and are based on hexamethylene diisocyanate, such as may be obtained, for example, by the processes of U.S. Pat. Nos. 3,124,605, 3,903,126, 3,903,127 and 3,976,622, which are composed of mixtures of N,N',N"-tris-(6-isocyanatohexyl)biuret with minor amounts of its higher homologs, and also the cyclic trimers of hexamethylene diisocyanate which meet the above criteria, as may be obtained in accordance with U.S. Pat. No. 4,324,879, composed essentially of N,N',N"-tris-(6isocyanatohexyl)isocyanurate as a mixture with minor amounts of its higher homologs.

The aromatic polyisocyanates which are likewise suitable in accordance with the invention but less preferred are, in particular, "paint polyisocyanates" based on 2,4-diisocyanatotoluene or its technical-grade mixtures with 2,6-diisocyanatotoluene or based on 4,4'-diisocyanatodiphenylmethane or its mixtures with its isomers and/or higher homologs.

Likewise suitable polyisocyanate crosslinkers are those hydrophilicized by the incorporation of polyether groups and/or salt groups, as described, for example, in DE-A-41 36 618 or U.S. Pat. No. 4,663,377.

Preferred crosslinker resins are the above-described polyisocyanate crosslinkers containing free isocyanate groups, especially hydrophilicized crosslinkers on this basis. With particular preference, the polyisocyanate component B) comprises those polyisocyanates or polyisocyanate mixtures containing exclusively aliphatically and/or cycloaliphatically attached isocyanate groups with an (average) NCO functionality of between about 2.2 and about 5.0 and a viscosity, determined using a rotational viscometer at 23° C., of from about 50 to about 1,500 mPas.

The coating compositions of the invention generally contain, based in each case on solids, from about 50 to about 95% by weight, preferably from about 65 to about 90% by weight, of the hydroxyl-containing component A) in combination with from 4 to 50% by weight, preferably from about 5 to about 35% by weight, of crosslinker B). The solids content of the coating compositions is generally from about 35 to about 70% by weight.

The coating compositions of the invention may of course include conventional auxiliaries and additives of coatings technology. These include, for example, defoamers, thickeners, leveling assistants, pigments, flatting agents, dispersing assistants for pigment dispersion, and the like.

The coating compositions of the invention which comprise melamine resins or blocked polyisocyanates as crosslinker resins, and coating compositions or sealants based on binder combinations of this kind, constitute heat-crosslinkable one-component systems which can be stored at room temperature. Corresponding systems comprising polyisocyanates containing free isocyanate groups as crosslinkers constitute two-component systems, which are obtained by blending the individual components and which have only a limited pot life at room temperature.

The preferred fields of use for the polysiloxane-polyurethane dispersions of the invention include their use as a binder component in elastic coating materials and sealants, especially in soft-feel materials, for the coating of plastics and interior coating of automobiles, for example. However, the polyester-polyurethane dispersions of the invention are also suitable as a binder component for aqueous coating materials for plastics, foils, leather, metal or wood, and also as a binder component for the coating of mineral substrates.

Further preferred applications include use as release or antistick coatings and also water vapor permeable and/or dirt-insensitive coatings.

In the formulation of the coatings of the invention, it is of course also possible to combine them with other binders, such as, for example, an anionically and/or nonionically hydrophilically modified, hydroxyl-free PU resin having a molecular mass Mw of at least about 15,000.

Surprisingly it is impossible using the polysiloxane-polyurethane dispersion of the invention to formulate coatings having soft feel properties without the need to use further binders, such as the PU dispersion 1) from EP-B-0 669 352, for example, or solids which influence the tactile properties.

(Unless otherwise specified, the molecular masses are numerical ($M_n$)).

EXAMPLES

In the examples below all percentages are by weight. The pH values were determined in accordance with DIN 53 785 following dilution with distilled water to a solids content of 10% by weight.

a) Preparation Examples

Example 1

Inventive

A reaction vessel with stirring, cooling, and heating means was charged with 84.0 g of the polyester Oxyester T1136 (hydroxyl content about 3.2%, Degussa AG), 24.0 g of the hydroxyalkyl-modified polydimethylsiloxane Tegomer®H-Si 2311 (Mw=2,500 g/mol, Goldschmidt AG), 16.8 g of 2,2-bis(hydroxymethyl)propionic acid (DMPA) and 54.0 g of N-methylpyrrolidone (NMP) under nitrogen and this initial charge was heated to 60° C. and homogenized.

Then 105.7 g of isophorone diisocyanate (IPDI) and 0.2 g of dibutyltin dilaurate (DBTL) were added and the mixture was stirred at 90° C. until (about 1 h) the theoretical isocyanate content of about 8% had been reached (prepolymer (I)). 12.0 g of 1,4-butanediol were added to this reaction mixture which was then stirred at 90° C. until (about 1 h) the theoretical isocyanate content of about 3.9% had been reached (prepolymer (II)).

Then 27.6 g of trimethylolpropane (TMP) were added and the mixture was stirred at about 120 to about 130° C. until NCO groups were no longer detectable. After the mixture had been cooled to 100° C., 10.1 g of triethylamine (TEA) and 365.7 g of water were added with stirring.

This gave a polysiloxane-polyurethane dispersion 1) having a solids content of 40%, a hydroxyl group content of 1.8% and an organic solvent content of 7.5%.

Comparative Example 1

Preparation was carried out as in Example 1) with the difference that the synthesis took place in accordance with EP-B-0 669 352 (process according to Example 1)) in one step by reacting all the polyol components with the diisocyanate and catalyst until NCO groups were no longer detectable.

This gave an inhomogeneous polysiloxane-polyurethane dispersion 2) in which the polysiloxane Tegomer®H-Si 2311 had not been fully incorporated by reaction.

Comparative Example 2

As a prior art comparative example, the polyester-polyurethane dispersion of Example 1) from EP-B-0 669 352 was chosen.

b) Use Examples

Use Example 1

Inventive 50.0 g of the polysiloxane-polyurethane dispersion 1), 3.0 g of silica TS 100 (Degussa AG), 3.0 g of flatting agent Pergopak® M3 (Martinswerk, Bergheim), 0.3 g of TEGO® Wet KL245 (wetting additive, Tego Chemie Service), 0.5 g of TEGO® Foamex 805 (defoamer, Tego Chemie Service), 1.0 g of Acrysol RM8 (thickener, Rohm & Haas) and 42.2 g of distilled water were triturated together.

Then 10.0 g of isocyanate crosslinker Desmodur® N3300 (Bayer AG) were incorporated by emulsification with stirring.

At 23° C. and a relative humidity of about 55%, the paint film was applied to glass or plastic plates, cured at room temperature for 10 minutes and then at 80° C. for one hour. The dry film thickness was 50 μm.

The paint properties were tested after the films had been aged (48 hours at room temperature).

Use Example 2

Comparative

Analogous to Use Example 1), the dispersion chosen being that from Comparative Example 1) instead of the polysiloxane-polyurethane dispersion from Example 1).

Use Example 3

Comparative

In accordance with the prior art, Use Example 1) from EP-B-0 669 352 was tested.

The results obtained were as follows:

The optical properties of the film (film homogeneity, uniformity of the degree of flatting, pigment wetting) of Use Examples 1 and 3 were satisfactory, but the film from Use Example 2 showed severe paint film defects and could not be tested.

| Use Example | Dispersion | Soft feel effect[1] | Adhesion[2] (cross-cut) | Solvent resistance[3] |
|---|---|---|---|---|
| 1)* | 1) | 1 | 1 | 1/1/4/0 |
| 2)** | 2) | n.d. | n.d. | n.d. |
| 3)** | 3) | 2 | 1–2 | 1/1/4/0 |

*Inventive
**Comparative
1. Value 0 = very good soft feel effect,
   Value 2 = good soft feel effect,
   Value 5 = no soft feel effect
2. Cross-cut according to DIN 53230,
   Value 0 = excellent adhesion,
   Value 2 = good adhesion,
   Value 5 = very poor adhesion
3. Exposure carried out for 1 minute with a cotton pad containing solvent, solvent:
   (premium-grade gasoline/methoxypropyl acetate/xylene/ethanol)
   Value 0 = no change,
   Value 5 = paint detached,
   n.d. = not determinable.

Another factor regarded as being of particular advantage of the polysiloxane-polyurethane dispersion of the invention from Example 1) is the fact that even without the use of flatting agents which influence the tactile properties, such as Pergopak® M3 or Silitin® Z86 (Hoffmann & Söhne KG), for example, it is possible to achieve a pronounced soft feel effect.

Use Example 4

Inventive 50.0 g of the polysiloxane-polyurethane dispersion 1), 3.0 g of silica TS 100 (Degussa AG), 3.0 g of flatting agent Pergopak® M3 (Martinswerk, Bergheim), 0.3 g of TEGO® Wet KL245 (wetting additive, Tego Chemie Service), 0.5 g of TEGO® Foamex 805 (defoamer, Tego Chemie Service), 1.0 g of Acrysol RM8 (thickener, Rohm & Haas) and 42.2 g of distilled water were triturated together.

Then 6.0 g of amino crosslinker resin Cymel® 327 (American Cyanamid) were added. At 23° C. and a relative humidity of about 55%, the paint film was applied to glass plates, cured at room temperature for 10 minutes and then at 150° C. for 20 minutes. The dry film thickness was 50 μm.

The paint properties were tested after the films had been aged (48 hours at room temperature).

Use Example 5

Comparative

As the state of the art, a baking formulation formulated with amino crosslinker resin and based on a polyester-polyurethane dispersion in accordance with Use Example 14) from EP-B-0 669 352 was chosen.

The results obtained were as follows:

| Use Example | Dispersion | Soft feel effect[1] | Adhesion[2] (cross-cut) | Solvent resistance[3] |
|---|---|---|---|---|
| 4)* | 1) | 1–2 | 1 | 0/0/1/0 |
| 5)** | 3) | 2–3 | 1–2 | 0/0/1/0 |

*Inventive
**Comparative
1. Value 0 = very good soft feel effect,
   Value 2 = good soft feel effect,
   Value 5 = no soft feel effect
2. Cross-cut according to DIN 53230,
   Value 0 = excellent adhesion,
   Value 2 = good adhesion,
   Value 5 = very poor adhesion
3. Exposure carried out for 1 minute with a cotton pad containing solvent, solvent:
   (premium-grade gasoline/methoxypropyl acetate/xylene/ethanol)
   Value 0 = no change,
   Value 5 = paint detached,
   n.d. = not determinable.

Clearly evident from the comparative examples was the superiority of the polysiloxane-polyurethane dispersion of the invention and of the process of the invention for preparing polysiloxane-polyurethane dispersions.

The above description of the invention is intended to be illustrative and not limiting. Various changes of modifications in the embodiments described herein may occur to those skilled in the art. These changes can be made without departing from the scope or spirit of the invention.

What is claimed is:

1. A process for preparing an aqueous polysiloxane-polyurethane dispersion having an acid number of from about 5 to about 100 mg KOH/g polysiloxane-polyurethane solids, a hydroxyl group content of from about 0.25 to about 6.5% by weight, and a urethane group content (calculated as —NH—CO—O—) of from about 2.0 to about 25.0% by weight, based in each case on polysiloxane-polyurethane solids, wherein the polyurethanes are products, where appropriate at least partly neutralized with bases, which comprises (1) reacting together the following components:
   a) a total of from about 3 to about 25% by weight of at least one linear polydimethylsiloxanediol of the molecular mass rage about 1,500 to about 10,000;
   b) a total of from about 15 to about 90% by weight of at least one further linear polyol, selected from the group consisting of
      i) hydroxyl-containing polycarbonates of the molecular mass range about 400 to about 6,000,
      ii) hydroxyl-containing polyetherpolyols of the molecular mass range about 350 to about 3,500,
      iii) ester-functional polyesterpolyols obtained from dimer fatty acids by hydrogenating the carboxyl groups to hydroxyl groups, alkoxylating the carboxyl groups or esterifying the carboxyl groups with low molecular mass diols, and
      iv) hydroxyl-containing linear polyesterpolyols of the molecular mass range about 500 to about 4,000;
   c) a total of from about 1 to about 10% by weight of at least one acid component composed of
      i) hydroxycarboxylic acids,
      ii) aminocarboxylic acids,
      iii) aminosulfonic acids or
      iv) alkali metal salts of such acids;
   and
   f) a total of from about 5 to about 50% by weight of at least one polyisocyanate component composed of at least one organic polyisocyanate of the molecular mass range about 168 to about 1,000, at least 50% by weight of the polyisocyanate component comprising diisocyanates of the molecular mass range about 168 to about 300, and, optionally, d) a total from 0 to about 20% by weight of at least one low molecular mass component comprising of at least one compound containing at least two hydroxyl and/or amino groups, of the molecular mass range about 60 to about 300, and/or e) a total of from 0 to about 20% by weight of at least one hydrophylic monohydric or polyhydric alcohol containing ethylene oxide units, of the molecular mass range of about 350 to about 3,000, wherein the NCO/OH ratio of each component is from about 1.8:1 to 3.0:1: to form an isocyanate functional prepolymer (I), and wherein the percentages for components a) to f) added up to 100% by weight of the polyurethane fractions of the polysiloxane-polyurethane solids;

(2) converting the prepolymer (I) into an isocyanate-functional prepolymer (II) by reacting the prepolymer (I) with component d), wherein the NCO/OH ratio is from about 1.2:1 to about 1.6:1, followed by subsequently converting the product obtained by reacting the product with further component b) and/or d), to give the final hydroxyl-containing polysiloxane-polyurethane polymer, and (3) dispersing the polysiloxane polyurethane polymer by adding the polysiloxane-polyurethane polymer to water in the presence of a neutralizing agent.

2. The process according to claim 1, wherein the components which are reacted are:

from about 5.0 to about 15.0% by weight of component a;

from about 20.0 to about 70.0% by weight of component b;

from about 2.0 to about 7.0% by weight of component c;

from about 0.5 to about 10.0% by weight of component d;

from 0 to about 10.0% by weight of component e; and from about 7.0 to about 30.0% by weight of component f, where:

component a is composed of a linear polydimethylsiloxane of molecular mass in the range from about 2,000 to about 4,000;

component b is composed of a linear polyesterdiol of molecular mass about 500 to about 4,000 and/or a linear polycarbonatediol of molecular mass about 750 to about 4,000;

component c is composed of at least about 85% by weight of 2,2-dimethylolpropionic acid and/or 2,2-dimethylolbutyric acid;

component d is composed of at least one low molecular mass diol and/or triol of molecular mass about 90 to about 150; and component e is composed of at least about 75% by weight of cycloaliphatic diisocyanates of the molecular mass range about 166 to about 300 the percentages given for a) to f) adding up in each case to 100% by weight of the polyurethane fractions of the polysiloxane-polyurethane solids.

3. The process according to claim 1 wherein the linear polydimethylsilocane is an α,ω-dihydroxyalkyl-polydimethylsiloxane.

* * * * *